Figure 1:
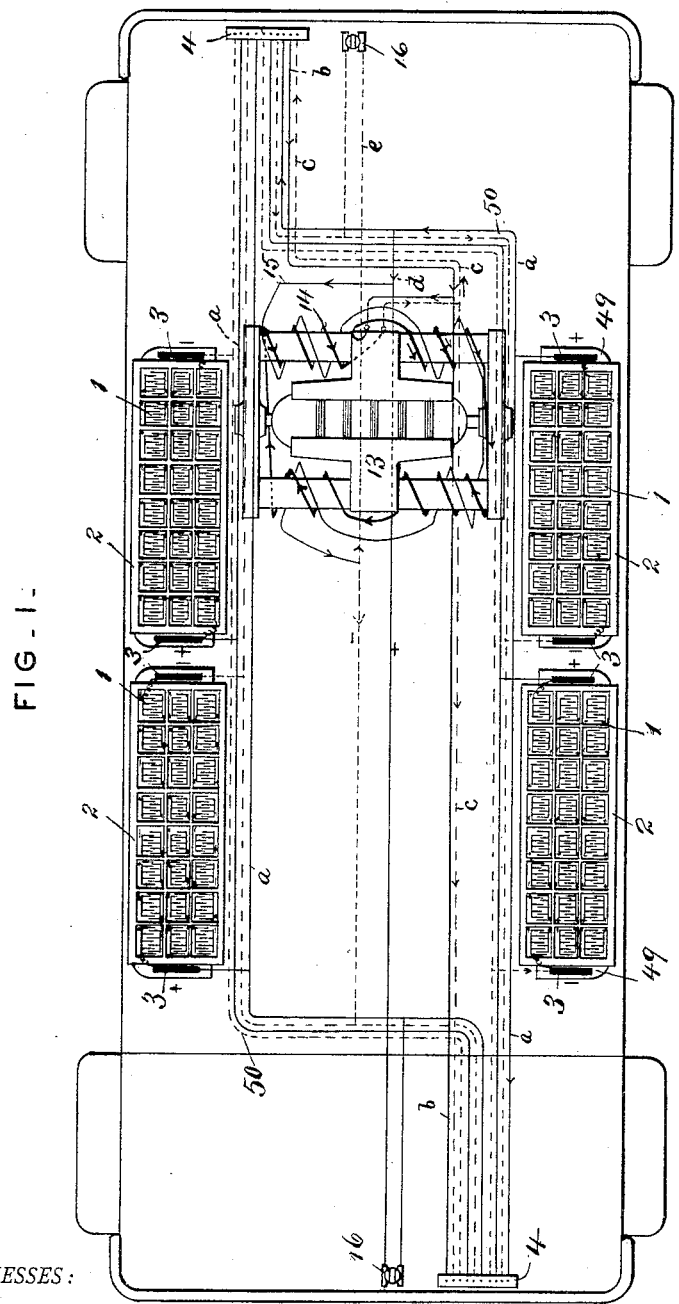

(No Model.) 11 Sheets—Sheet 1.

E. JULIEN.
APPARATUS FOR ELECTRIC TRACTION.

No. 384,580. Patented June 12, 1888.

WITNESSES:

INVENTOR.
Edmond Julien.
BY
Knight Bro
ATTORNEYS.

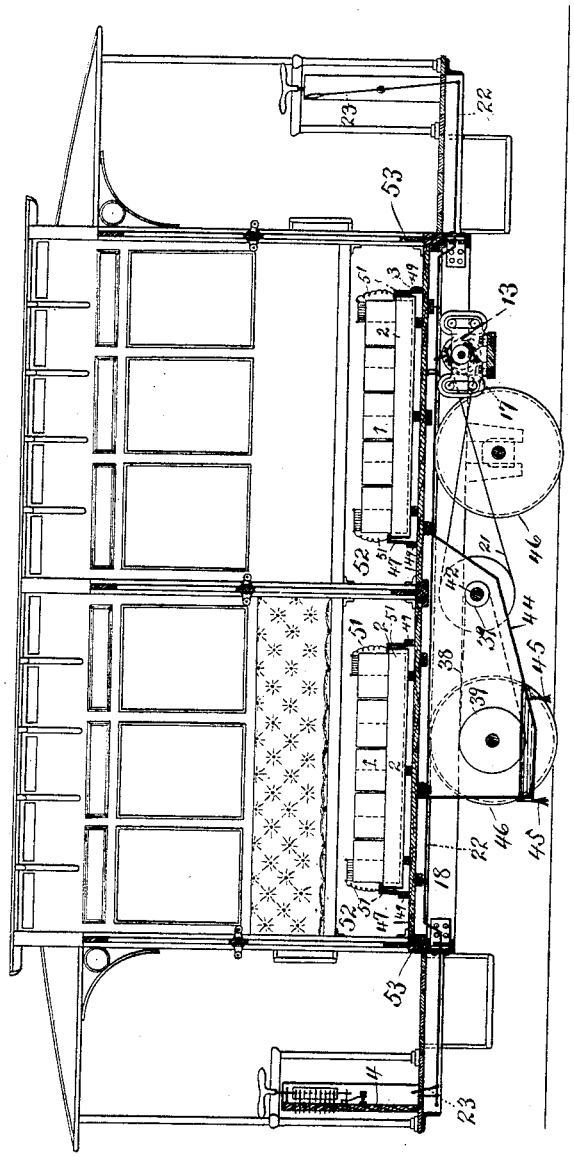

(No Model.) 11 Sheets—Sheet 3.
E. JULIEN.
APPARATUS FOR ELECTRIC TRACTION.
No. 384,580. Patented June 12, 1888.
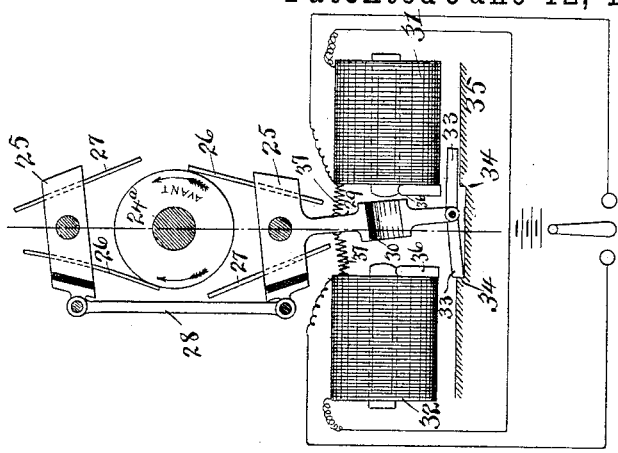
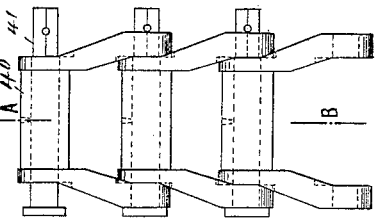
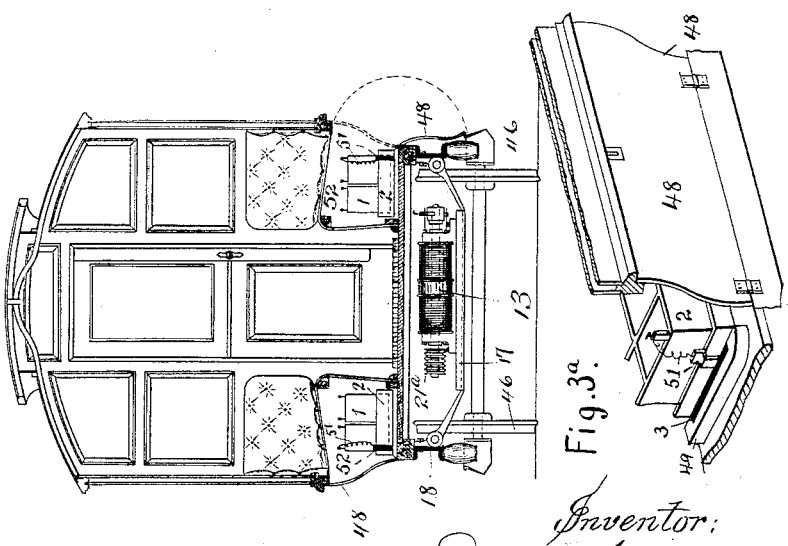
Attest:
Geo. T. Smallwood.
Edmund Steer.
Inventor:
Edmond Julien.
By Knight Bros.
Attys (No Model.) 11 Sheets—Sheet 4.

E. JULIEN.
APPARATUS FOR ELECTRIC TRACTION.

No. 384,580. Patented June 12, 1888.

Attest:
Geo. T. Smallwood.
Edward Steer.

Inventor:
Edmond Julien.
By Knight Bros
Attys (No Model.)  11 Sheets—Sheet 5.

E. JULIEN.
APPARATUS FOR ELECTRIC TRACTION.

No. 384,580. Patented June 12, 1888.

Attest:
Geo. T. Smallwood.
Edward Steu.

Inventor:
Edmond Julien,
By Knight Bros
attys (No Model.) 11 Sheets—Sheet 6.

E. JULIEN.
APPARATUS FOR ELECTRIC TRACTION.

No. 384,580. Patented June 12, 1888.

Attest:
Geo. T. Smallwood.
Edward Itev.

Inventor.
Edmond Julien.
By Wright Bros.
Att'ys.

(No Model.) 11 Sheets—Sheet 7.
E. JULIEN.
APPARATUS FOR ELECTRIC TRACTION.

No. 384,580. Patented June 12, 1888.

Attest:
Geo. T. Smallwood.
Edward Stew.

Inventor:
Edmond Julien,
By Knight Bros
attys.

(No Model.) 11 Sheets—Sheet 8.
E. JULIEN.
APPARATUS FOR ELECTRIC TRACTION.
No. 384,580. Patented June 12, 1888.
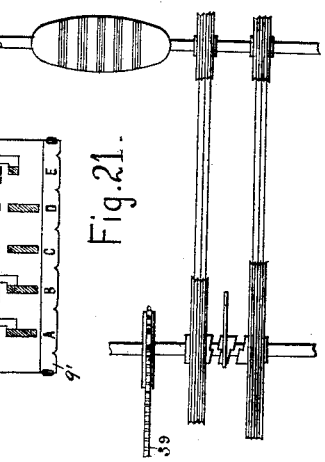
Fig. 21.
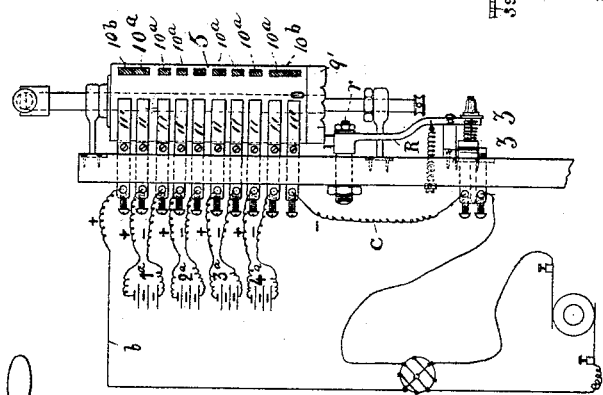
Fig. 12.
Fig. 11.
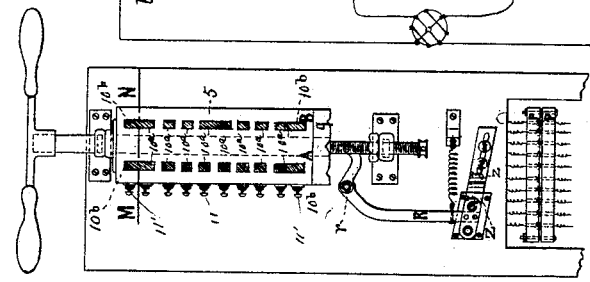
Fig. 10.
Attest:
Geo. T. Smallwood.
Edmond Stew.
Inventor:
Edmond Julien
By Knight Bros.
Attys.

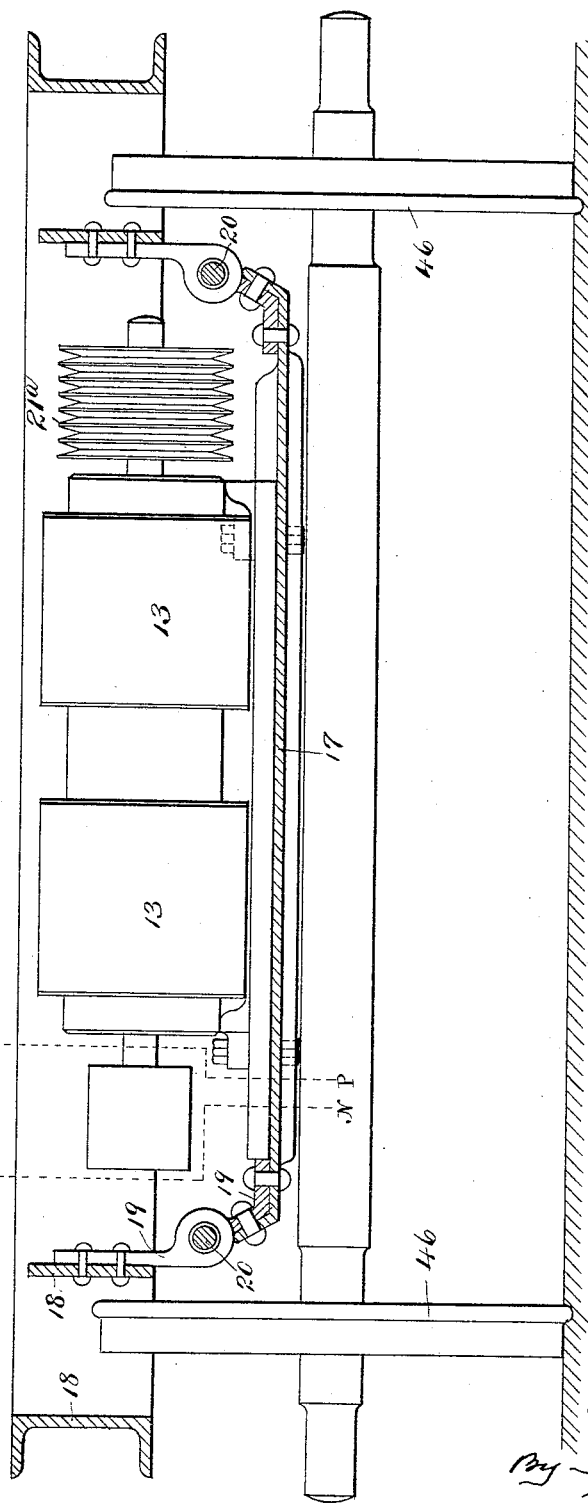

(No Model.) 11 Sheets—Sheet 10.

E. JULIEN.
APPARATUS FOR ELECTRIC TRACTION.

No. 384,580. Patented June 12. 1888.

Attest:
Edward Stein.
H. C. Knight.

Inventor:
Edmond Julien.
By Knight Bros.
Attys.

(No Model.)
11 Sheets—Sheet 11.
E. JULIEN.
APPARATUS FOR ELECTRIC TRACTION.
No. 384,580. Patented June 12, 1888.
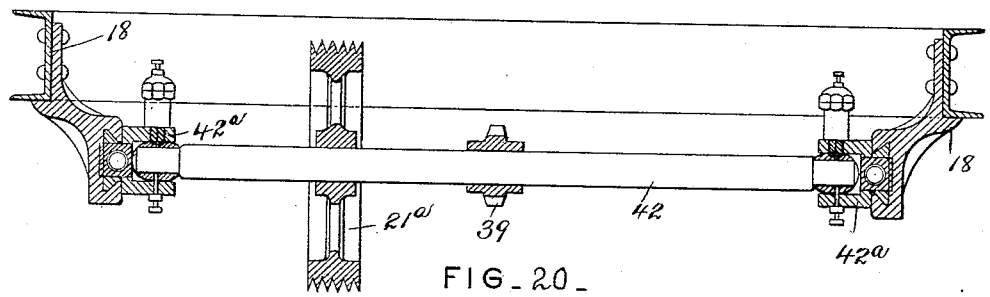
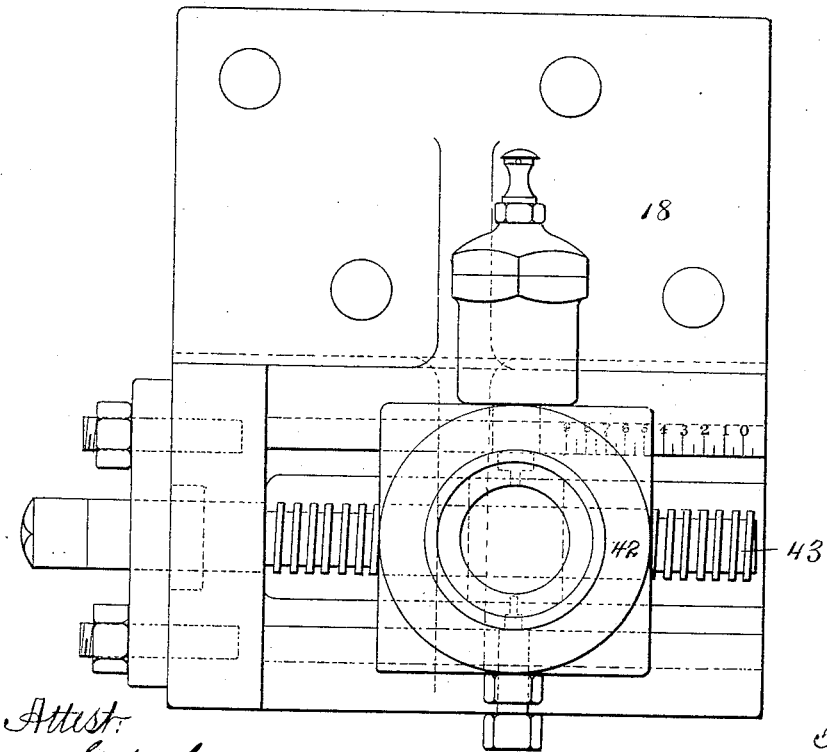

UNITED STATES PATENT OFFICE.

EDMOND JULIEN, OF BRUSSELS, BELGIUM.

APPARATUS FOR ELECTRIC TRACTION.

SPECIFICATION forming part of Letters Patent No. 384,580, dated June 12, 1888.

Application filed February 17, 1886. Serial No. 192,249. (No model.) Patented in Belgium September 7, 1883, No. 62,521, March 7, 1884, No. 64,412, February 5, 1886, No. 71,868, and November 19, 1886, No. 75,288, and in England February 19, 1886, No. 2,470.

*To all whom it may concern:*

Be it known that I, EDMOND JULIEN, a subject of the King of Belgium, residing at Brussels, Belgium, have invented certain new and useful Improvements in Systems of Electric Traction, of which the following is a specification.

Until the present time the subject of electric traction by means of accumulators has only given rise to trials of short duration, and the devices proposed by inventors have been one by one abandoned, or have not even been put in practice, and so have conferred no benefit on the public. By sustained study of the subject and after much experimentation I have been able to render practical the new method of traction by the combination of expedients best adapted for the purpose. From a mechanical point of view these expedients consist almost entirely in improvements or adaptations of various well-known devices for transmitting the movement of a motor to an axle and combining the same in various ways with novel apparatus especially devised for the purpose. The well-known results attained by me justify the expedients that I have adopted, their effect being to make an electric railway enter for the first time into the domain of practical industry.

The present application for a patent relates to a complete system for the transformation of electric energy into mechanical energy for the purpose of imparting movement to vehicles of all kinds, whether rolling, sliding, or floating. This system is the subject of Belgian patents, September 7, 1883, No. 62,521; March 7, 1884, No. 64,412; February 5, 1886, No. 71,868, and November 19, 1886, No. 75,288, and British patent, February 19, 1886, No. 2,470.

I will first describe the system in a general manner, it being understood that the means employed and shown can be varied to a certain extent, according to the vehicle to which they are applied.

In order that the description may be rendered more clear, I refer to the accompanying drawings, in which—

Figure 4:
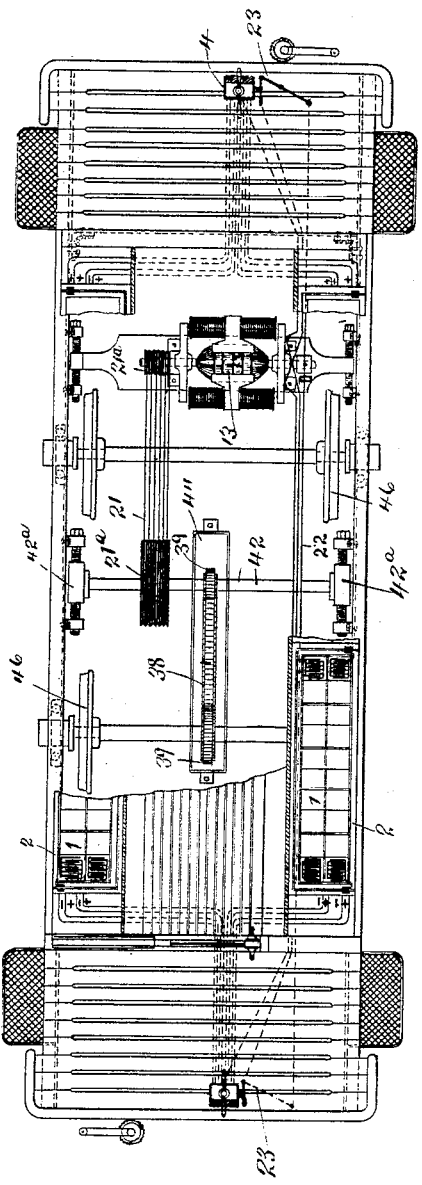
Figure 6:
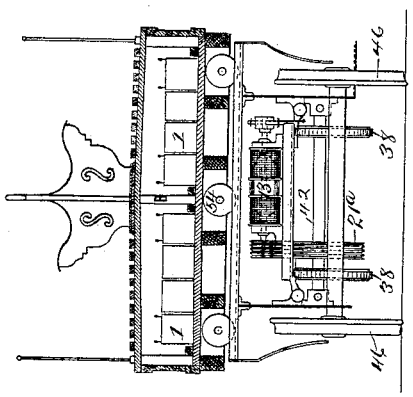
Figure 5:
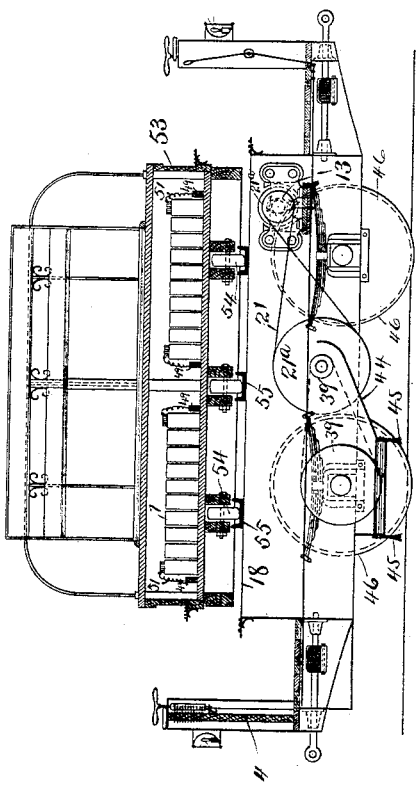
Figure 7:
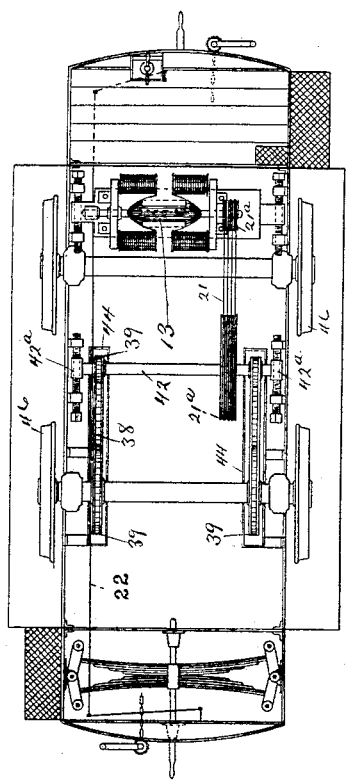
Figure 7A:
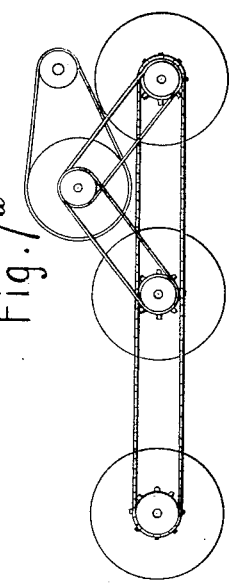
Figure 9:
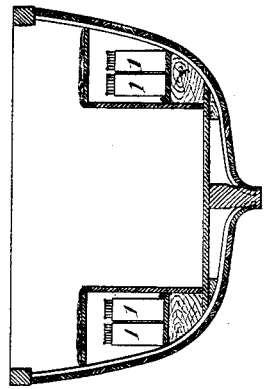
Figure 8:
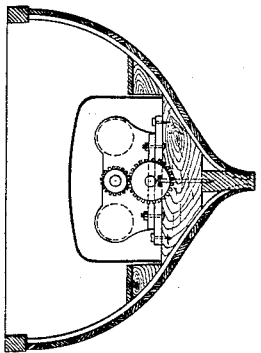
Figure 10:
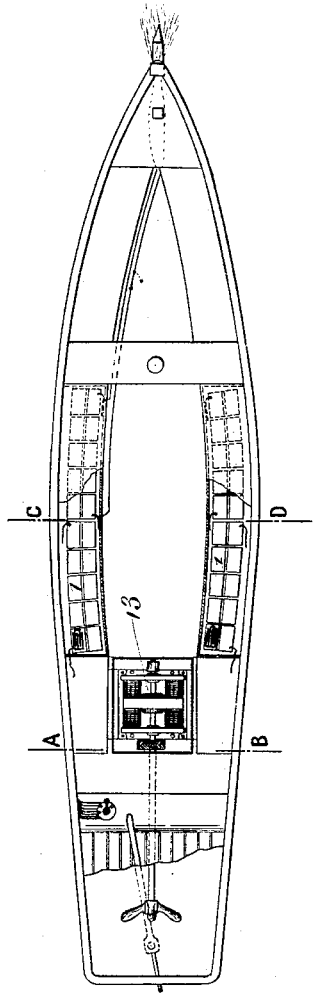
Figure 14:
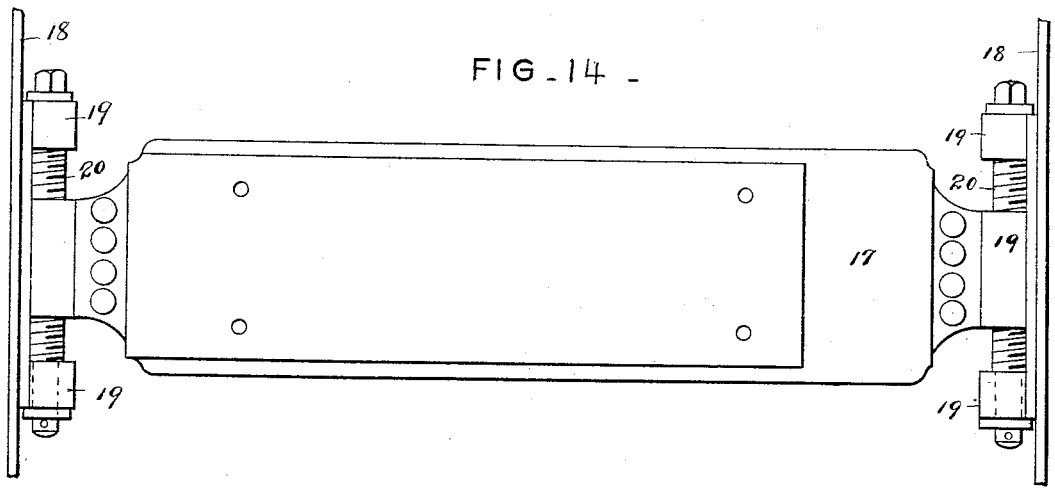
Figure 15:
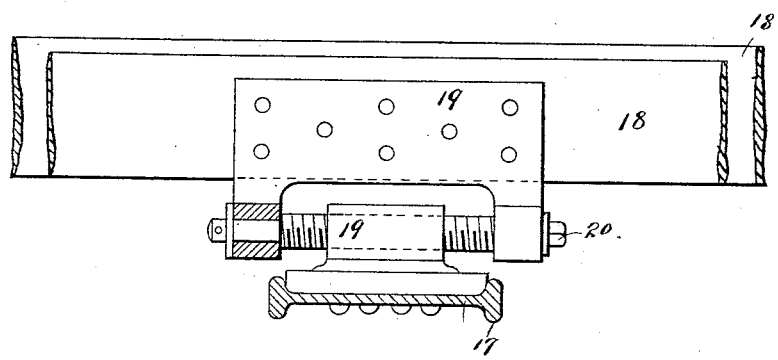
Figure 16:
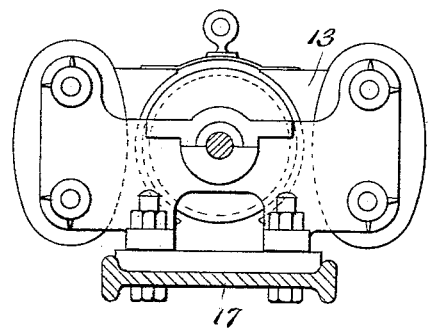

Figure 1 shows in plan the arrangement of accumulators in circuit on a tram-car. Fig. 2 is a sectional elevation of the car. Fig. 3 is a transverse sectional elevation of the same. Fig. 3ª is an enlarged detail view showing the movable panel in perspective, and also showing the automatic contacts. Fig. 4 is a plan view thereof, showing the running-gear and motive power. Fig. 5 is a longitudinal section showing the invention applied to a locomotive. Fig. 6 is a transverse sectional view of the same. Fig. 7 is a plan thereof, showing the running-gear and motive power. Fig. 7ª is a sectional elevation showing a modification of the driving mechanism. Fig. 8 is a transverse sectional view of a boat to which the invention is applied, the plane of section being indicated by the line A B, Fig. 10. Fig. 9 is a similar view, the plane of section being indicated by the line C D, Fig. 10. Fig. 10 is a plan view, partly sectioned, of the boat. Fig. 10ª is a face view of the current and speed regulator. Fig. 11 is a side view showing the current and speed regulator. Fig. 12 is a plane development of the cylinder of said regulator. Fig. 13 is a vertical transverse section of the wheel-frame of the car through the support of the motor. Fig. 14 is a plan view of such support. Fig. 15 is a sectional view thereof on the line M N, Fig. 13. Fig. 16 is a vertical sectional view on the line O P, Fig. 13. Fig. 17 is an elevation of a form of current-reversing device. Fig. 18 is a face view showing three links of my improved chain. Fig. 19 is a transverse sectional view of the wheel-frame, showing the method of hanging the intermediate shaft, hereinafter more fully described. Fig. 20 is a side elevation of a support at one end of said shaft. Fig. 21 is a partial plan view of a modified form of transmitting mechanism.

When the source of energy carried by the vehicle is a secondary battery, I prefer to employ an improved accumulator differing entirely in principle from secondary batteries heretofore known and used, and which I have described in my United States Patent, dated the 10th of August, 1886, No. 347,300.

It will be readily understood that for electric traction it is essential that the accumulators employed should not be subject to alteration and to other defects, which have so far prevented their use in this connection.

I divide my battery into several independent series, 1, each placed in a movable drawer, 2, arranged to slide or mounted on rollers and having automatically-acting contacts 3 51, the former, 3, being connected by fixed conductors to the regulators 4 for controlling the current, and consequently the speed, of the vehicle, and the latter, 51, being connected to the terminals of the batteries.

The object of having automatic contacts is to assure the perfection of the service, while obviating the inconveniences of numerous connections, avoiding labor, and facilitating the removal and charging of batteries—operations which are carried out with a speed and economy such as no other arrangement will permit. However, in certain cases the accumulators may be made stationary.

The arrangement of the accumulators in several independent series requires a special controlling apparatus, 4, described and claimed in my application for Letters Patent, filed November 13, 1887, Serial No. 221,119. This apparatus is shown in Figs. $10^a$, 11, and 12, and is for the purpose of putting the several series in circuit with the motor, grouping them in series in quantity or in multiple series, according to the current required. It thus serves to control the vehicle and regulate its speed. This device is composed, Figs. $10^a$, 11, and 12, of a cylinder of ebonite, 5, or other insulating material, traversed by a metallic axis carrying the crank. In the interior of the cylinder I place conducting-pieces A B C D, &c., in such manner that they are insulated one from the other. Each of these pieces carries as many exterior ends or projections, $10^a$, as there are series in the battery. These projections, placed in the same vertical line on the surface of the cylinder, are intended to meet the fixed contacts 11, which are united to the poles of the series of accumulators. Two other contacts, $10^b$, are united to the end ones, $10^a$, of each line and contact with two fixed brushes, 11′, connected with the motor.

I call attention to the fact that the contacts $10^a$ have a different arrangement on each line of contact, as shown in Fig. 12. The contact-brushes are furnished with conductors ending each in a piece, P, arranged in such manner that these conductors are readily connected to those of the accumulators and of the motor, which also end in a similar piece, P′, Fig. $10^a$. To form the circuits therefor, it is only necessary to clamp these two pieces together. The cylinder carries at its base a ring, 9′, of cast-steel, in which I form as many notches plus one as there are lines of contact.

To render intelligible the mechanism, I will suppose that the battery of accumulators is divided into four series, $1^a$ $2^a$ $3^a$ $4^a$. There will then be eight contact-brushes, 11. The first brush 11 is connected to the $+$ pole of series $1^a$, and the second brush 11 to the $-$ pole of the same series. In the same way the third and fourth are connected to the poles of series $2^a$, and so on. The two end brushes, 11′, are respectively connected to the $+$ and $-$ binding-posts of the dynamo. When the switch is fixed at the notch of "rest" 0, as shown in Fig. 11, the brushes are not in contact with pieces $10^a$ and $10^b$, and the circuit is open. If the cylinder is turned, the circuit is closed on the line of the connection A, which puts the four series in quantity. In continuing the movement of rotation the cylinder places the line of connection B in contact with the brushes, and the circuit is then closed through the series $1^a$ $2^a$ and $3^a$ $4^a$, arranged by sets of two in multiple arc and connected up in series. At the following notch, C, the switch unites the two intermediate series in multiple arc and couples three series in "tension." At the fourth notch, D, the four series are coupled in tension. It is seen that at the third notch the series $2^a$ and $3^a$ each furnish only one-half of the current required for the other two. In order that the quantity of electricity may finally remain the same in all the series, I arrange on the rim 9′ of the cylinder an additional notch corresponding to a further line of connection, E, which unites the similar poles of all the series in such a manner that equilibrium is established in all the elements. This last line of contact does not carry the contacts $10^b$, corresponding with the brushes connected to the dynamo.

It will be seen from Figs. $10^a$ and 11, which are a face and a side elevation, respectively, that the cylinder is connected by supports to a piece of wood, and that it is moved by means of a crank against the brushes which are fixed to this piece. Fig. $10^a$ shows the development of the interior and exterior plans of the cylinder. The hatched portion of the connection-pieces are views at the surface where they constitute the contacts $10^a$ and $11^b$. When the cylinder turns before the brushes and these latter quit, a line of contact-sparks are produced which tend to deteriorate the body of the cylinder and the contact-pieces. To remedy this I have arranged a little cam-lever, R, pivoted at $r$, Fig. $10^a$, which cuts automatically the circuit of the machine at $z z$ before the brushes leave the line of contact, and which re-establishes it at the desired moment. The spark is then produced at the pieces $z$, which can be replaced easily and at little cost. The automatic movement of the lever R is obtained by notches made in the ring forming the base of the cylinder, into which the upper end of R falls, and I call attention to the fact that these notches serve also as guides to the person operating the apparatus. By means of this device all the series operate together and in the same manner, and the discharging of all of the accumulators of a battery is uniform, so that the recharging may also be uniform, a circumstance of the utmost practical importance. In this manner all irregularities and complications which ordinarily occur when it is necessary to group rapidly several series in different manners are avoided, and the employment of artificial resistance, indispensable on all other systems of traction, also done away with.

The electric motor 13, preferably employed by me, is also made the subject of an application for patent filed of November 30, 1886, No. 220,282. Its peculiarities are that its compact and solid form enables it to resist successfully the trembling motion of a vehicle, that it occupies a comparatively small space, and it is thus completely adapted for use on a vehicle; that it possesses two distinct inducing-circuits, one in the circuit with the batteries and the regulator above described and shown at 14, the other, 15, in circuit also with the batteries, but having a separate controlling-switch, 16, at each end of the car or other vehicle, and that it is furnished with a special reversing device. These peculiarities render the motor especially adapted to electric traction. The use of a second exciting-circuit independent of the main circuit of the motor is necessitated in most cases by the variations in the work to be performed.

The path of the inducing-circuit 14 through the batteries, regulator, and motor is as follows: For instance, supposing the current to start from the positive pole of one of the battery series it will follow the wire $a$ to the regulator 4, where it is directed by the mechanism before described into the positive wire $b$ of the motor; it follows this conductor, as shown by the arrows, to one binding-post of the motor, and thence along the conductor represented by a heavy line and back to the other binding-post of the motor. It is then conveyed by the negative wire $c$ (represented by dotted lines) back to the regulator, where it is directed into the wires represented by dotted lines connected to the negative poles of the several battery series.

When the motor is working under normal conditions, the current which passes through the main inducing-coils is sufficient for the magnetizing action; but when the vehicle encounters a resistance greater than normal—as, for example, if it should be necessary to mount a hill—the number of turns of the armature, and consequently the speed of the vehicle, tend to diminish just as the effort to be exerted increases. To remedy this serious inconvenience, I then make an exciting-current pass in the second inducing-coil of the motor, and the increasing magnetism resulting from this re-establishes the speed of the armature. The second circuit may be connected directly with the source of electricity supplying current to the main circuit, or it may be a derived circuit of the main one. In Fig. 1 of the drawings I have represented a single one of the battery series capable of being connected with the second circuit by a switch, 16, at either end of the car. As applied to electric traction this improvement is of the greatest importance.

The flow of current produced by the operation of this switch 16 may be traced as follows: Supposing the circuit to be closed by the switch 16, the current will flow along wire $a$ to wire $d$, and from here it will follow the wire represented by a light line through the motor, and thence back to the negative pole of the battery via the wire $e$, the switch 16, and the wire from the negative pole of the battery connected with the switch.

The motor is carried by a movable support or carriage, as shown in Figs. 13, 14, 15, and 16. This support consists of a bar or plate, 17, of I or angle iron suspended from stringers 18 or other parts of the vehicle by lugs 19 and adjusting-screws or tension devices 20, in such manner as to permit a certain displacement of the motor in the plane of the transmitting belts or cords 21. This adjustment is useful in order to enable the regulation at will of the tension of the latter. The motor is bolted to the supporting bar or plate, but is insulated therefrom by a block of wood or other suitable means.

Instead of the precise form of adjustable carriage shown, I may support the motor on a frame movable upon the axle-boxes or upon the body of the vehicle.

To change the direction of movement of a vehicle, I may employ either mechanical or electrical devices. If mechanical means be employed, the reversing of the commutator-brushes is effected by means of rods or chains 22, controlled by a lever, 23, which may be placed upon the platform of the vehicle near the regulator, as shown in Fig. 2, or at any other point on the vehicle. Preferably, however, an electrical brush-reversing device is employed, its form being shown in Fig. 17 as applied to an ordinary collector or commutator. In this figure $24^a$ represents a collector in section 25, the brush-carriers turning on pins fixed to one end of the frame of the machine and 26 27 the brushes. The two brush-carriers 25 are united by a rod, 28, insulated at the ends from the brush-carriers. One of the brush-carriers bears a bronze arm, 29, having a soft-iron armature, 30, attracted at will by either of the two electro-magnets 31 and 32. By means of an ordinary switch placed in the circuit with the magnets and the batteries a current is directed through either of the electro-magnets 31 32. The magnetic action exerted by the current, for example, in magnet 31 draws the armature 30 and arm 29 to one side, turning the brush carriers on their axes until the brushes 26 touch and rest on the commutator. The vehicle will then travel in the direction of the arrow marked "avant." To obtain a reverse action, the current is directed into electro-magnet 32. To retain the brushes on either magnet, I employ gravity-pawls 33, pivoted on the arm 29, and which rest behind one of the shoulders 34 on a fixed block, 35. To disengage either pawl 33 preliminary to the shifting of the arm 30 from one side to the other, I provide the cores of the magnets with extensions 36. In order to throw the brush-shifting mechanism to a neutral position, so that none of the brushes will touch the commutator, current is directed through both magnets 31 32, and the action of the two being then almost equalized, the springs 37 are enabled to place the arm 29 at a position midway between the magnets. The electro-magnets 31 32 and the shouldered block 35 are supported upon the carriage of the motor.

In some cases instead of having two pairs of brushes, I may employ a single pair and reverse the motion of the armature by a current-reversing device placed in the circuit of the motor. Such a modification of the circuit is shown in Fig. 11.

The mechanism for transmitting the motion of the motor to the wheels is of great importance, especially in the case of a tram-car. I have found out by experience that it is generally necessary to avoid in such case the employment of rigid transmitting mechanism. Such mechanism is of course not capable of use when the motor is hung from the stringers or body of the vehicle by reason of the movement of the body on its springs and its variable position relatively to the driven axle.

While any mechanical means of transmission conveniently adaptable to the vehicle may be employed, I prefer to use endless-rope cables 21, suitably prepared and carried on pulleys $21^a$, having several grooves, a chain, 38, of peculiar construction, and toothed pinions 39, the chain being fully described in my co-pending application for patent filed November 29, 1886, Serial No. 220,168, and consisting of a series of links having each a sleeve, 40, and pin 41, Fig. 18, for connecting the links together in such manner as to avoid the rapid wear and consequent lengthening of the chain which ordinarily take place when such chains are used for transmitting power at high velocity, and a speed-reducing shaft, 42, intermediate of the motor and the driven axle or axles. The method of supporting this shaft is shown in Figs. 19 and 20. It is hung from the stringers 18 or body of the vehicle by means of sliding boxes $42^a$ and provided with a screw, 43, for adjusting it in a horizontal plane to give more or less tension to the transmitting cords and chains.

In some cases two separate pulleys may be keyed to the motor-shaft and two pulleys of different diameters may run loosely on the intermediate shaft, either one being connected thereto at will by an ordinary clutch. Fig. 21 represents such a modification of the transmitting mechanism.

Attention is called to the fact that all the mechanism of which I make use is of the greatest simplicity and has, as herein combined, the effect of reducing friction and resistance of inertia to a minimum—an important point from an economical point of view in the use of comparatively feeble forces. To lessen, however, still further the friction and the wear of surfaces in contact and sensibly increase the economy, I cause the chain-wheel 39 on the driven axle to dip into an oil or grease bath contained in a reservoir, 44, of any suitable form. Preferably it envelops the chain and pinions to receive the oil, and thus also protects them from the action of dust and to a considerable extent deadens the noise. It carries stiff brooms 45 at base to remove from the track objects which might injure the reservoir or gearing or derail the car.

The system above described is rendered more complete by lighting the vehicles by means of electricity taken from the batteries 1, and by operating the brakes by aid of the same agent, and the vehicles may also be warmed by energy from the same source.

Heretofore I have described in general the several novel features forming parts of my improved system. I will briefly indicate the method of operation.

When the controlling-regulator closes the circuit, the current furnished by the source of electricity actuates the motor, which drives the axles either directly or through the medium of an intermediate shaft according to circumstances. The vehicle will therefore move with a greater or less speed, according to the resistance to be overcome and according to the number of batteries that have been placed in series in the circuit by the regulator. To stop the vehicle, it is only necessary to open the circuit by turning the regulator, while for reversing its motion the direction of current in the motor is reversed either by shifting the brushes mechanically or electrically, or by shifting a special switch in the circuit.

The various devices, whose construction and operation when assembled in a system of electric traction have been described above, are capable of use on a great variety of vehicles. I will describe in detail its application to several.

First, considering the exceedingly important case of the application of the system to the cars now drawn by animals on tramways or street-car lines, I call attention to the fact that such application is especially valuable in that it does not require the construction of new material, but renders possible the use, with slight expense for transformation, of the rolling-stock (now very considerable) actually employed on such ways. I will take as an example the type of car or tram most commonly used—that is to say, one having a body suspended on two axles, and having longitudinal seats, as shown in Figs. 2, 3, and 4. In preparing such a car for use with this system it is generally necessary to raise the body of the car a few centimeters, so that the wheels 46 will not pass through the floor 47 of the car. The body, being thus raised, is fixed on a frame of wood bolted on a frame or truck formed of iron stringers 18 (of such dimensions and so assembled as to assure the perfect rigidity of the frame) and cross-bars of angle-iron or wood on which the floor of the car-body is supported. The exterior panels, 48, of the car-body, closing the free space under the seats, are made movable, (see Figs. 3 and 3ª,) and receptacles are provided in which accumulators or batteries placed in movable drawers 2, having automatically-operating contact-plates for entering the circuit of the motor, are put. These panels are hinged at bottom to the side beam of the car, and are secured at the top by any suitable latch or bolt, as shown. Each drawer contains an independent series, as already explained, and can therefore be rapidly and at will replaced with a freshly-charged battery when its electricity is exhausted. On the floor of the receptacles in the car-body are placed wooden guides 49, which insure the proper location of the drawers in their receptacles. On top of these guides spring-plates of copper 3, each in connection by conductors 50 14 with the controlling regulator, are placed so as to receive the contact terminals 51, carried by the drawers of accumulators. Figs. 1, 2, 3, 3ª, and 4 show this apparatus and the arrangement of the mechanism in the case of transmission of the movement of the motor-shaft by rope belts and chain. 52 is the receptacle in the car containing a battery of accumulators divided in series 1, each in a drawer, 2. The controlling-regulators 4 are placed in a protecting-casing on each platform in position convenient to the hand of the conductor and near the reversing-levers 23. In these figures the electric-current-reversing device is not shown. 13 is the electric motor with grooved pulley on its armature-shaft. The motor is carried by a movable support suspended by adjusting-screws or tension-regulating device from the stringers, the car-body 53, the cross-beams of the car-frame, or from a fixed or movable frame resting on the axle-boxes. 42 is the intermediate shaft, with a grooved pulley, 21ª, and a pinion, 39. The shaft is carried by boxes 42, having adjusting-screws and movable on the stringers or suspended from the cross-beams of the body. 21 are ropes carried in the grooves of pulleys, and 38 is a chain carried by pinion and chain-wheels 39 39, the latter on the driving-axle. 44 is the casing forming an oil-reservoir, in which dips the chain 38 and wheel 39, and which I also make use of to carry brooms 45, in order to protect these parts. The support of the motor and the intermediate shaft being, in the construction here shown, both hung from the stringers of the car-frame, form transverse thrust-pieces for resisting the bending of the stringers and maintaining the rigidity of the frame. In case of necessity, sand-boxes are provided on the car, as is generally the case in mechanical traction-motors. When a great adherence to the rails is necessary, I couple the axles together by means of chains, belts, or ropes, or any other suitable means.

Any preferred or customary means of braking and of lighting may be employed. It is readily seen, however, that the presence of an effective source of electricity renders possible the use of electricity for both these purposes in any customary manner.

In the second place, I consider the application of this system to an electric locomotive. Here I am allowed greater liberty in the choice of location for the battery of accumulators, and I profit by this to give to the locomotive a special form, differing essentially from the known types used on railways. My locomotive is shown in Figs. 5, 6, and 7 of the drawings, wherein 18 is an iron frame forming stringers with two platforms, the whole suspended on the axles and carrying the electric motor 13 and the power-transmitting mechanism. 53 is a box or body mounted on rollers 54. I may or not provide the box with movable panels. This box carries the several series of accumulators, and is provided with a double longitudinal seat, so that the locomotive can be used for transporting a number of passengers. Instead of this arrangement, however, it may be made to serve in carrying merchandise. When the accumulators are exhausted, the box or body is rolled off, if mounted on rollers, and replaced by one containing freshly-charged accumulators; or, if the box is fixed with movable panels, the accumulators are replaced, as in the case of the self acting car already described. In the drawings the box is represented on rollers running on rails 55 arranged on the stringers 18.

The electrical parts of the apparatus for the locomotive, as well as the transmitting and regulating mechanism, are substantially the same as for the self-acting car. The driving-axle is shown driven by two chains, 38. A locomotive having but two axles is shown; but the same type may have three axles or more. In this case two of the axles will be driven from the motor direct by chains, and all will be coupled together, as shown in Fig. 7ª. The electric locomotive, as well as the self-acting car, may be made at will to move in either direction and is lighted electrically from the battery. The brake is not shown. In a general way all that has been said of this system in general and of the self-acting car is equally applicable to the locomotive.

In applying the system to navigation the general arrangements above described are employed in the case of side-wheeled boats. In screw-propellers the motor may in many cases actuate the screw-shaft directly. For small boats I lodge the batteries of accumulators against the sides under the longitudinal seats, as indicated in Figs. 9 and 10. The weight of the battery is useful as ballast, and the battery may provide current for electric signal-lanterns, as shown, by way of example, for a bow-lantern in Fig. 10.

Having thus described my invention, the following is what I claim as new therein and desire to secure by Letters Patent:

1. In combination with a vehicle, an electric motor, a supporting bar or plate therefor hung from the vehicle, and adjusting-screws at both ends of said support for moving said motor in the plane of its support, substantially as set forth.

2. In combination with a motor, a movable carriage or support, an insulating-block between said motor and support, supporting-lugs on a vehicle and the support, respectively, and adjusting-screw connecting such lugs, substantially as and for the purpose set forth.

3. In an electrically-propelled vehicle, in combination with a casing protecting the power-transmitting mechanism, brooms on said casing, substantially as and for the purpose set forth.

4. In an electrically-propelled vehicle, in combination with the motor and its commutator, a current-reversing device consisting of two pairs of commutator-brushes and their carriers, an armature on one of the brush-carriers, electro-magnets controlling said armature, an electric circuit including a source of electricity and the said magnets, a switch whereby current may be directed into either magnet, and a locking device for holding either of the pairs of brushes in contact with the commutator of the motor, substantially as and for the purpose set forth.

5. In an electrically-propelled vehicle, the combination of an electric battery divided into several independent series, each of said series being placed in a drawer or box carrying exposed terminals, a current-regulator having multiple couplings and connected with the terminals of the said batteries, an electric motor fixed on a movable support and bearing on its field-magnets two distinct exciting-circuits independently controlled, a current-reversing device, flexible transmitting mechanism between motor-shaft and axle, and a protecting casing around such mechanism carrying brooms, all substantially as and for the purpose set forth.

In testimony whereof I have signed this specification in the presence of two subscribing witnesses.

EDMOND JULIEN.

Witnesses:
ADOLF STEIN,
EMILE PICARD.